United States Patent [19]

McCauley

[11] Patent Number: 4,824,305
[45] Date of Patent: Apr. 25, 1989

[54] DECORATIVE AND PROTECTIVE CAP FOR LOCKNUT

[75] Inventor: Lewis D. McCauley, Eggertsville, N.Y.

[73] Assignee: McGard, Inc., Buffalo, N.Y.

[21] Appl. No.: 168,912

[22] Filed: Mar. 15, 1988

[51] Int. Cl.$^4$ ............................................. F16B 37/14
[52] U.S. Cl. .................................... 411/431; 411/372; 411/374; 411/908; 411/910
[58] Field of Search .............................. 411/429–431, 411/371–374, 908, 910; 70/229–232; 10/86 C

[56] References Cited

U.S. PATENT DOCUMENTS

| | | | |
|---|---|---|---|
| 4,324,516 | 4/1982 | Sain et al. ........................ | 411/910 X |
| 4,618,299 | 10/1986 | Bainbridge et al. ................ | 411/374 |
| 4,648,293 | 3/1987 | McCauley ........................... | 81/436 |
| 4,659,273 | 4/1987 | Dudley .............................. | 411/910 X |
| 4,723,866 | 2/1988 | McCauley ........................... | 404/25 |

Primary Examiner—Gary L. Smith
Assistant Examiner—Douglas E. Ringel
Attorney, Agent, or Firm—Joseph P. Gastel

[57] ABSTRACT

A decorative and protective cap for mounting on a threaded stud to conceal and protect a locknut threadably mounted therein, the cap including a shell having a cylindrical portion for providing a close fit with the outer surface of the locknut, a hexagonal wrench-receiving portion on the shell, and a plastic insert retained within the shell. The plastic insert has a portion with depressions therein for receiving internal lugs of the shell to thereby permanently mount the insert within the shell. An annular longitudinally slotted portion of the insert has an internal thread for mating engagement with the thread of the stud.

24 Claims, 2 Drawing Sheets

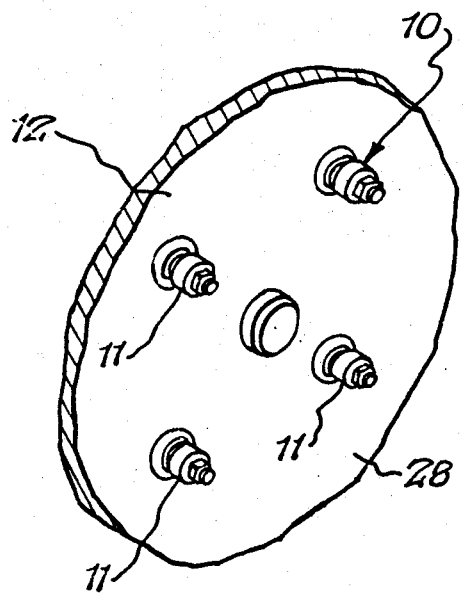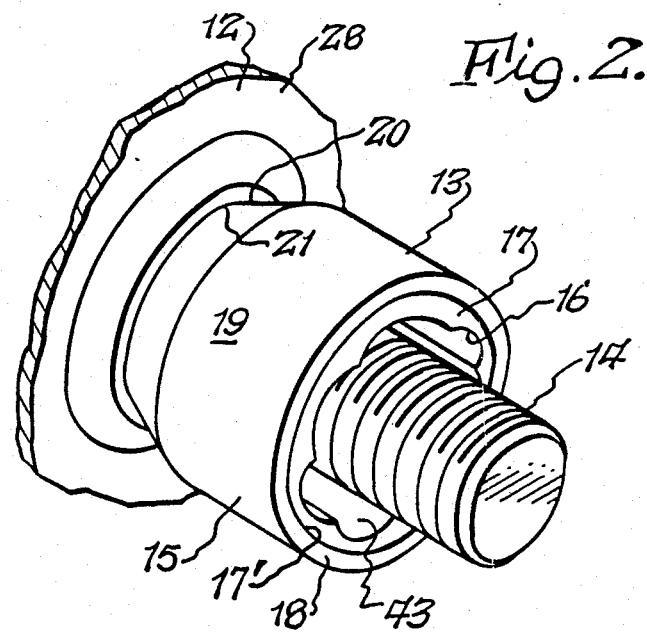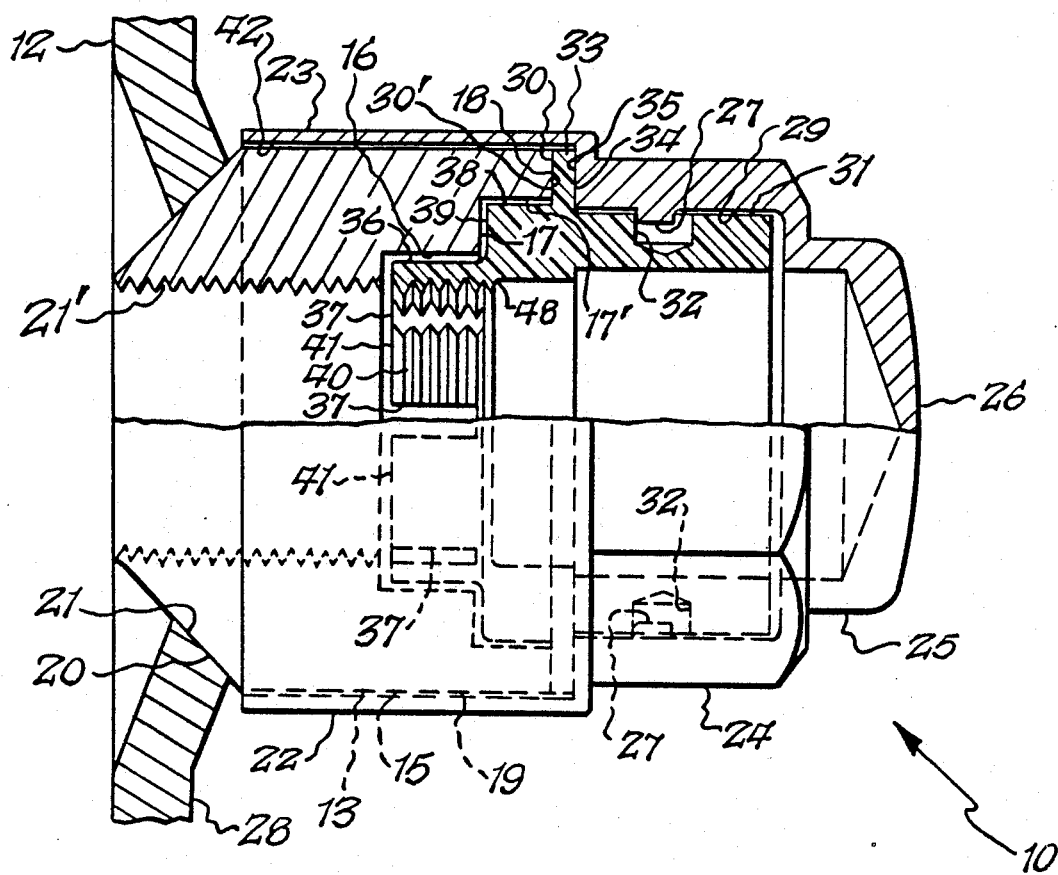

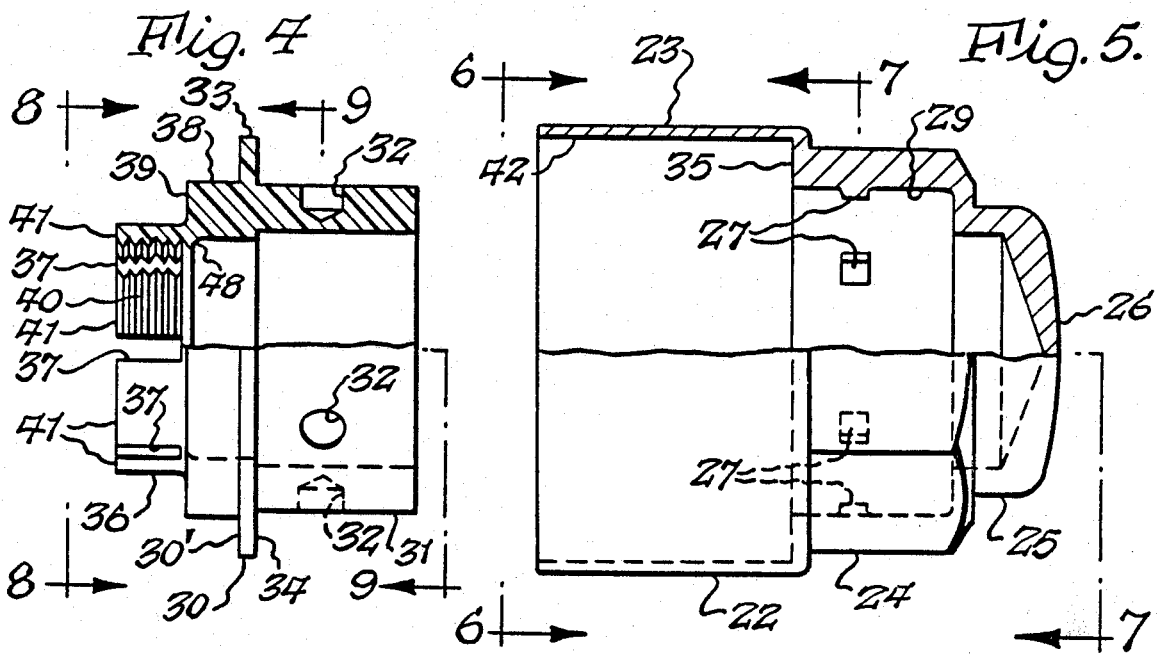
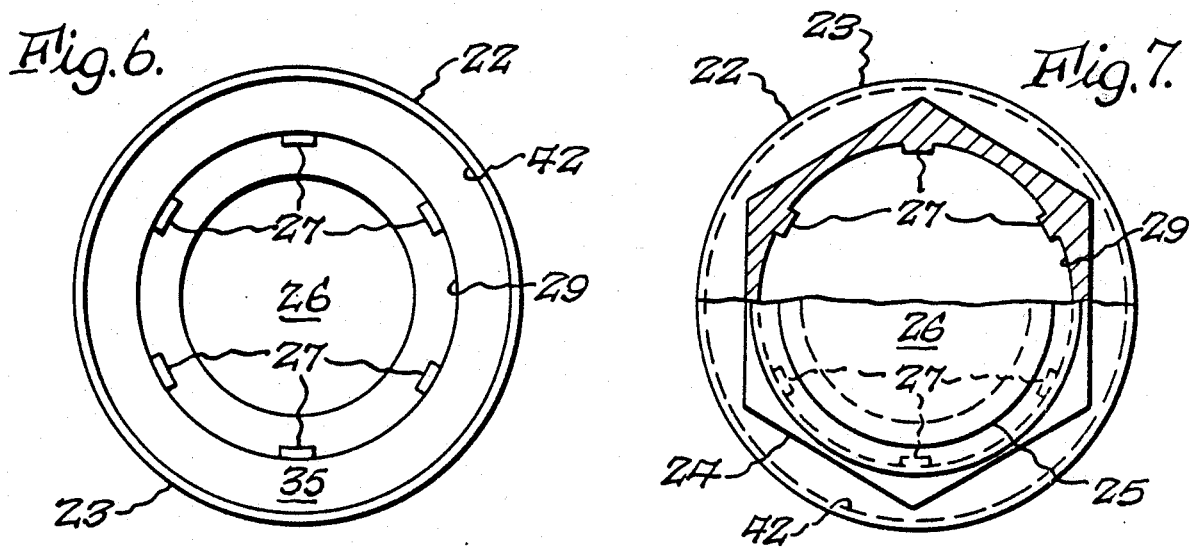
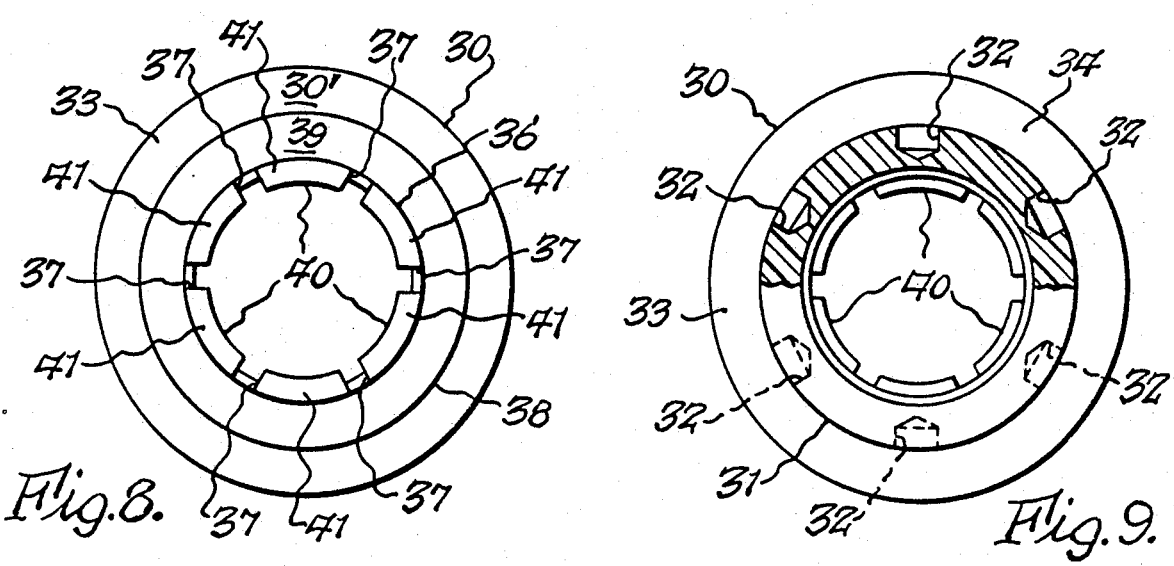

DECORATIVE AND PROTECTIVE CAP FOR LOCKNUT

BACKGROUND OF THE INVENTION

The present invention relates to a decorative and protective cap for concealing and protecting a locknut which is mounted on a stud on which a vehicle wheel rim is mounted.

By way of background, locknuts of the type having a curvilinear groove therein are used to lock a rim to the axle of an automotive vehicle. Locknuts of this type can only be installed properly or removed by the use of a mating key. It is in this manner that the vehicle wheel rim is secured against unauthorized removal.

In the past, the locknuts did not match the remainder of the nuts which secured the vehicle rim to the axle. However, this was relatively immaterial when the wheel rim had a hub cap which concealed the nuts from view. However, there are now in use wheel rims which have exposed nuts, that is, a hub cap is not used in conjunction with the rim. Accordingly, it is desirable that the locknut should match the remainder of the lug nuts which are used. However, this is quite an impossibility because the locknut is of a shape which cannot be turned by a conventional wrench, and, further, the conventional lug nuts do not have curvilinear grooves therein.

In addition to the foregoing, the key-receiving curvilinear grooves of exposed locknuts can retain dirt and debris which may prevent the associated key from seating properly.

SUMMARY OF THE INVENTION

It is accordingly the object of the present invention to provide a decorative and protective cap for a locknut which is used to lock a vehicle rim to a lug against unauthorized removal, the cap being of a shape which will match the other exposed lug nuts associated with the rim and also protecting the key-receiving groove of the locknut from exposure to dirt and debris.

It is another object of the present invention to provide an unique decorative and protective cap for association with a locknut, the cap being composed of an outer shell and an insert, with the insert including a thread structure which cannot be stripped in the event that the cap is over-tightened. Other objects and attendant advantages of the present invention will readily be perceived hereafter.

The present invention relates to a removable decorative and protective cap for mounting on a threaded stud proximate a locknut through which said threaded stud protrudes comprising an outer decorative shell having an inner shell surface and a predetermined outer configuration, a cap insert having an outer insert surface and an inner insert surface, interfitting means on said inner shell surface and said cap insert for retaining said cap insert within said decorative shell, and a thread on said inner insert surface for receiving said threaded stud in threaded engagement to thereby mount said decorative and protective cap on said threaded stud proximate said locknut.

The various aspects of the present invention will be more fully understood when the following portions of the specification are read in conjunction with the accompanying drawings wherein:

BRIEF DESCRIPTION OF THE DRAWINGS

FIG. 1 is a fragmentary perspective view of a vehicle wheel rim mounting a plurality of conventional nuts and a locknut having the decorative and protective cap of the present invention mounted thereon;

FIG. 2 is an enlarged fragmentary perspective view of the locknut mounted on its associated stud which projects through the vehicle rim;

FIG. 3 is a fragmentary side elevational view partially in cross section showing the decorative and protective cap mounted relative to an associated locknut;

FIG. 4 is a side elevational view, partially in cross section, showing the plastic insert of the decorative and protective cap;

FIG. 5 is a side elevational view, partially in cross section, of the shell portion of the protective and decorative cap;

FIG. 6 is an end view taken substantially in the direction of arrows 6—6 of FIG. 5;

FIG. 7 is a cross sectional view taken substantially along line 7—7 of FIG. 5;

FIG. 8 is an end elevational view taken substantially in the direction of arrows 8—8 of FIG. 4; and FIG. 9 is a cross sectional view taken substantially along line 9—9 of FIG. 4.

DESCRIPTION OF THE PREFERRED EMBODIMENTS

The decorative and protective cap 10 of the present invention is intended to look like the plurality of ordinary nuts 11 which are mounted on rim 12 of an automotive wheel. Actually decorative cap 10 is intended to protect and conceal locknut 13 which is threadably mounted on stud 14 secured to the axle (not shown) of the vehicle. Locknut 13 includes a cylindrical body portion 15 which has an axially extending curvilinear recess 16 which extends inwardly from recessed face 17 within counterbore 17'. Face 17 extends transversely to the surface of counterbore 17'. A thread 21' within locknut 13 threadably mounts it on stud 14. The frusto-conical end 20 of locknut 13 bears against a mating depression 21 of rim 12. Curvilinear recess 16 is of irregular configuration for receiving a mating key or wrench which is used to tighten and loosen it.

In accordance with the present invention, decorative and protective cap 10 is intended to fit over locknut 13 to conceal and protect it and is also intended to match ordinary nuts 11, thereby providing the vehicle wheel with a uniform appearance while also permitting it to be locked to the axle by means of locknut 13.

The decorative and protective cap 10 includes an outer shell 22 which includes a cylindrical portion 23, a hexagonal head portion 24 formed integrally therewith and a smaller cylindrical portion 25 which terminates at a closed curved surface 26. A plurality of square lugs 27 are formed integrally with and extend inwardly from the internal surface 29 of hexagonal portion 24. Shell 22 is fabricated from suitable metal, preferably stainless steel.

A molded plastic insert 30, which may be nylon, fits securely within shell 22. In this respect, insert 30 includes a cylindrical end portion 31 which has a plurality of depressions 32 therein which are circumferentially spaced the same distance apart as lugs 27. Thus, insert 30 can be pushed into the inner circumferential surface 29 of shell 22 and rotated until lugs 27 seat themselves into depressions 32 to thereby firmly retain insert 30 within shell 22. A collar 33 formed integrally with insert 30 has a surface 34 which abuts shoulder 35 of shell 22 when insert 30 is properly seated.

An end portion 36 is formed integrally and extends outwardly from collar 33. End portion 36 is an annular member having a plurality of circumferentially spaced longitudinal slots 37 throughout its length with the slots terminating at face 39 of annular portion 38 which merges into collar 30. A helical thread 40 is formed within annular member 36 for threadably receiving stud 14. The slots 37 permit the segments 41 between slots 37 to deflect radially outwardly about pivot areas 48 in the event that insert 30 is tightened too much onto stud 14. This deflection occurs before thread 40 is stripped.

In operation, the decorative and protective cap 10 comprising shell 22 with insert 30 permanently affixed therein by the connection between lugs 27 and depressions 32 is screwed onto stud 14 by causing threads 40 to thread onto the corresponding threads of the stud. The decorative cap 10 is rotated first by hand and thereafter by applying a wrench to hexagonal head 24. When the cap 10 is installed, the internal surface 42 of cylindrical shell portion 23 will fit closely over external surface 15 of lock nut 13. This prevents dirt and debris from entering key-receiving surface 16. The protective function of shell portion 23 may also be achieved if there is a slight space between it and the outer surface of the locknut. Also slotted annular portion 36 will move into the space 43 between internally fluted surface 16 and the outside of the threads on the stud 14, thereby further protecting surface 16. The cap 10 will move axially onto stud 14 until the face 30' of collar 30 abuts transverse edge 18 of locknut 13. Furthermore, since collar 30 is slightly compressible, when the decorative cap is tightened, collar 30 will be compressed between transverse edge 18 of locknut 13 and surface 35 of the shell 22. The compression of collar 30 and the tight fit between threads 40 and the external threads of the stud 14 will retain decorative cap 10 firmly in position.

The locknut 13 of FIGS. 1 and 2 is shown as being associated with a rim 12 in such a manner that the cylindrical portion 19 of the locknut is located outwardly from the major surface 28 of the wheel rim. However, it is contemplated that the cap 10 can also be used with locknuts such as 13 which are received within recessed portions of the vehicle rim because the cylindrical portion 23 of the cap 10 is sufficiently thin to enter the annular space between the outer surface of the locknut and the recessed surface of the rim.

While the shell 24 disclosed above has been fabricated by machinery, it can also be formed by deep drawing, in which event lugs analogous to lugs 27 can be formed by dimpling circumferentially spaced areas of hexagonal portion 24 inwardly. The dimples would be located on the flat portions of the hexagonal configuration.

It can thus be seen that the decorative cap 10 of the present invention is manifestly capable of achieving the above enumerated objects, and while preferred embodiments of the present invention have been disclosed, it will be appreciated that it is not limited thereto but may be otherwise embodied within the scope of the following claims.

What is claimed is:

1. A decorative and protective cap capable of repeated mounting and demounting relative to a threaded stud proximate a locknut through which said threaded stud protrudes comprising an outer decorative shell having an inner shell surface and a predetermined outer configuration, a cap insert having an outer insert surface and an inner insert surface, interfitting means on said inner shell surface and said cap insert for retaining said cap insert within said decorative shell and for locking said outer decorative shell and said cap insert against relative rotational movement, thread means on said inner insert surface for receiving said threaded stud in threaded engagement to thereby effect repeated mounting and demounting of said decorative and protective cap on said threaded stud proximate said locknut, and wrench-receiving means on said outer shell for receiving a wrench in interfitting engagement for rotating said decorative and protective cap, said mounting and demounting being effected by applying a rotating force to said wrench-receiving means on said outer shell to thereby effect rotation of said cap insert relative to said threaded stud because of said locking engagement between said outer shell and cap insert against relative rotational movement.

2. A removable decorative and protective cap as set forth in claim 1 wherein said interfitting means comprises a plurality of lugs extending inwardly from said inner shell surface, and a plurality of depressions in said outer insert surface for receiving said lugs to effect said locking engagement against relative rotational movement.

3. A removable decorative and protective cap as set forth in claim 2 wherein said outer decorative shell includes a skirt for overlying said locknut.

4. A removable decorative and protective cap as set forth in claim 3 including an internal shoulder within said shell for abutting said locknut when said cap insert is screwed tightly onto said threaded stud.

5. A removable decorative and protective cap as set forth in claim 4 wherein said internal shoulder is located on said outer insert surface.

6. A removable decorative and protective cap as set forth in claim 2 wherein said cap insert includes an annular portion spaced inwardly from said inner shell surface, an inner surface on said annular portion, and wherein said thread means is on said inner surface of said annular portion.

7. A removable decorative and protective cap as set forth in claim 6 wherein said annular portion includes longitudinally extending slit means to permit expansion of said annular portion to prevent stripping of said thread means due to overtightening.

8. A removable decorative and protective cap as set forth in claim 7 wherein said slit means comprises a plurality of longitudinally extending circumferentially spaced slits.

9. A removable decorative and protective cap as set forth in claim 7 including an internal shoulder within said shell for abutting said locknut when said cap insert is screwed tightly onto said threaded stud.

10. A removable decorative and protective cap as set forth in claim 9 wherein said internal shoulder is located on said outer insert surface.

11. A removable decorative and protective cap as set forth in claim 9 wherein said outer decorative shell includes a skirt for overlying said locknut.

12. A removable decorative and protective cap as set forth in claim 11 wherein said internal shoulder is located on said outer insert surface.

13. In combination with a locknut threadably mounted on a threaded stud with the locknut having a specialized depression in a transverse face thereof for receiving a mating key, a decorative and protective cap for repeated mounting and demounting relative to said threaded stud in contiguous relationship to said locknut comprising an outer decorative shell having an inner shell surface and a predetermined outer configuration, a cap insert having an outer insert surface and an inner insert surface, interfitting means on said inner shell surface and said cap insert for retaining said cap insert within said decorative shell and for locking said outer decorative shell and said cap insert against relative rotational movement, thread means on said inner insert surface for receiving said threaded stud in threaded engagement to thereby effect repeated mounting and demounting of said decorative and protective cap on said threaded stud proximate said locknut, and wrench-receiving means on said outer shell for receiving a wrench in interfitting engagement for rotating said decorative and protective cap, said mounting and demounting being effected by applying a rotating force to said wrench-receiving means on said outer shell to thereby effect rotation of said cap insert relative to said threaded stud because of said locking engagement between said shell and cap insert against relative rotational movement, and an end portion on said cap insert located within said specialized depression when said decorative and protective end cap is mounted in operative relationship relative to said locknut.

14. The combination as set forth in claim 13 wherein said interfitting means comprises a plurality of lugs extending inwardly from said inner shell surface, and a plurality of depressions in said outer insert surface for receiving said lugs to effect said locking engagement against relative rotational movement.

15. The combination as set forth in claim 14 wherein said outer decorative shell includes a skirt for overlying said locknut.

16. The combination as set forth in claim 15 including an internal shoulder within said shell for abutting said locknut when said cap insert is screwed tightly onto said threaded stud.

17. The combination as set forth in claim 16 wherein said internal shoulder is located on said outer insert surface.

18. The combination as set forth in claim 14 wherein said cap insert includes an annular portion spaced inwardly from said inner shell surface, an inner surface on said annular portion, and wherein said thread means is on said inner surface of said annular portion.

19. The combination as set forth in claim 18 wherein said annular portion includes longitudinally extending slit means to permit expansion of said annular portion to prevent stripping of said thread means due to overtightening.

20. The combination as set forth in claim 19 wherein said slit means comprises a plurality of longitudinally extending circumferentially spaced slits.

21. The combination as set forth in claim 19 including an internal shoulder within said shell for abutting said locknut when said cap insert is screwed tightly onto said threaded stud.

22. The combination as set forth in claim 21 wherein said internal shoulder is located on said outer insert surface.

23. The combination as set forth in claim 21 wherein said outer decorative shell includes a skirt for overlying said locknut.

24. The combination as set forth in claim 23 wherein said internal shoulder is located on said outer insert surface.

* * * * *